PULSE GENERATOR OF SPECIAL SIGNAL FOR SYNCHRONIZING RECEIVERS OF MASTER-REMOTE SYSTEM

Filed Feb. 20, 1969

INVENTOR
KLAUS GUELDENPFENNIG

BY Hoffman Stone
ATTORNEY

United States Patent Office 3,560,860

Patented Feb. 2, 1971

3,560,860

PULSE GENERATOR OF SPECIAL SIGNAL FOR SYNCHRONIZING RECEIVERS OF MASTER-REMOTE SYSTEM

Klaus Gueldenpfennig, Rochester, N.Y., assignor to Stromberg-Carlson Corporation, Rochester, N.Y., a corporation of Delaware Filed Feb. 20, 1969, Ser. No. 801,068

Int. Cl. H03k *1/00*

U.S. Cl. 328—63 1 Claim

ABSTRACT OF THE DISCLOSURE

A circuit for generating a special signal for synchronizing the receivers of a master-remote system of the kind used for the supervision and control of apparatus from a remote location, and in which the information signals used for supervision and control consist of trains of electrical pulses, all the pulses of each train being of the same length. Two special pulses are transmitted for synchronization just prior to the start of each train of information pulses. The special pulses are of predetermined polarity, and are each one and one-half times as long as the information pulses. The circuit uses a counter and a series of flip-flops and gates to produce the desired synchronizing signals, and also to define the proper durations of the information pulses. In addition, a gate arrangement is used to produce a special START DATA pulse at a predetermined time after the synchronizing pulses are completed.

BRIEF DESCRIPTION

This invention relates to a novel circuit for generating a special synchronizing signal for synchronizing receivers with transmitters in signalling systems of the type in which data, or information signals are sent in the form of trains of electrical pulses, which may occur at random times and following periods during which no signals are transmitted.

Synchronization in systems of the kind to which the present invention pertains must be positive for each train of data pulses to be transmitted. This is in contrast to ordinary systems of the pulse code modulated (PCM) type in which signals are continually transmitted in accordance with an ever repeating time frame, and in which the timing of the receiver may be repeatedly changed until synchronization is established.

Heretofore, in systems of the kind to which the invention pertains, the general practice has been to synchronize by transmitting a long series of pulses of equal duration to the data pulses, but in a pattern that is not apt to occur in the data pulse trains. The prior practice is subject to two principal disadvantages. First, a lot of time is used for synchronizing, and the capacity of the system is unduly limited. The importance of this may be better understood when it is appreciated that commonly the train of data pulses constituting any one message consists of only two words of twenty four bits each, a total of forty eight bits, while the series of synchronizing pulses needed for reliable operation must usually number at least forty eight bits. Thus, half, or more, of the utilization, or working time of the system is required for synchronization alone, and is not available for data transmission. Second, one must either arrange things so that the bit sequence in the synchronization series can never arise in the data trains, or accept the probability of false synchronizing whenever the data pulse train happens to duplicate the synchronizing sequence. If the first alternative is chosen, as it must be in many cases, the capacity of the system is further limited in respect of the number of different kinds of messages that can be transmitted.

In systems of the kind to which the present invention pertains, these problems are substantially overcome, and positive synchronization is established in a very short time by using a series of only two pulses for synchronization, the two pulses being of opposite polarity and each one and one-half times the duration of the data pulses. The system is arranged for timing with an accuracy of five percent of the duration of any one of the data pulses. Synchronization is thus positive, with no chance of error, because the synchronizing pulses differ from the data pulses by ten times the accuracy.

Briefly, the circuit according to the invention is arranged to be driven responsively to the clock of the transmitter, and includes a counter for dividing the clock frequency by ten. A series of flip-flops are connected in series to be driven in response to the output of the counter, and the outputs of the flip-flops are gated to produce the desired synchronizing signals followed by pulses for timing the duration of the data pulses. Also, signals from the counter and from the flip-flops are fed to an auxiliary gate to produce a DATA START signal at the end of a predetermined interval following the synchronization. The DATA START signal is fed to the transmitter to initiate sending of the data train.

Claims to the method of synchronization of systems to which the invention pertains, and a description of a detector circuit for identifying the special synchronizing pulses, together with claims to it, are included in the companion application of Gueldenpfennig and LaPierre, Ser. No. 800,945, filed concurrently herewith, and assigned to the present assignee. The present application is directed only to the circuit and method of generating the special synchronizing pulses.

DETAILED DESCRIPTION

A presently preferred embodiment of the invention will now be described in detail in conjunction with the accompanying drawing, wherein.

Figures 1, 2:
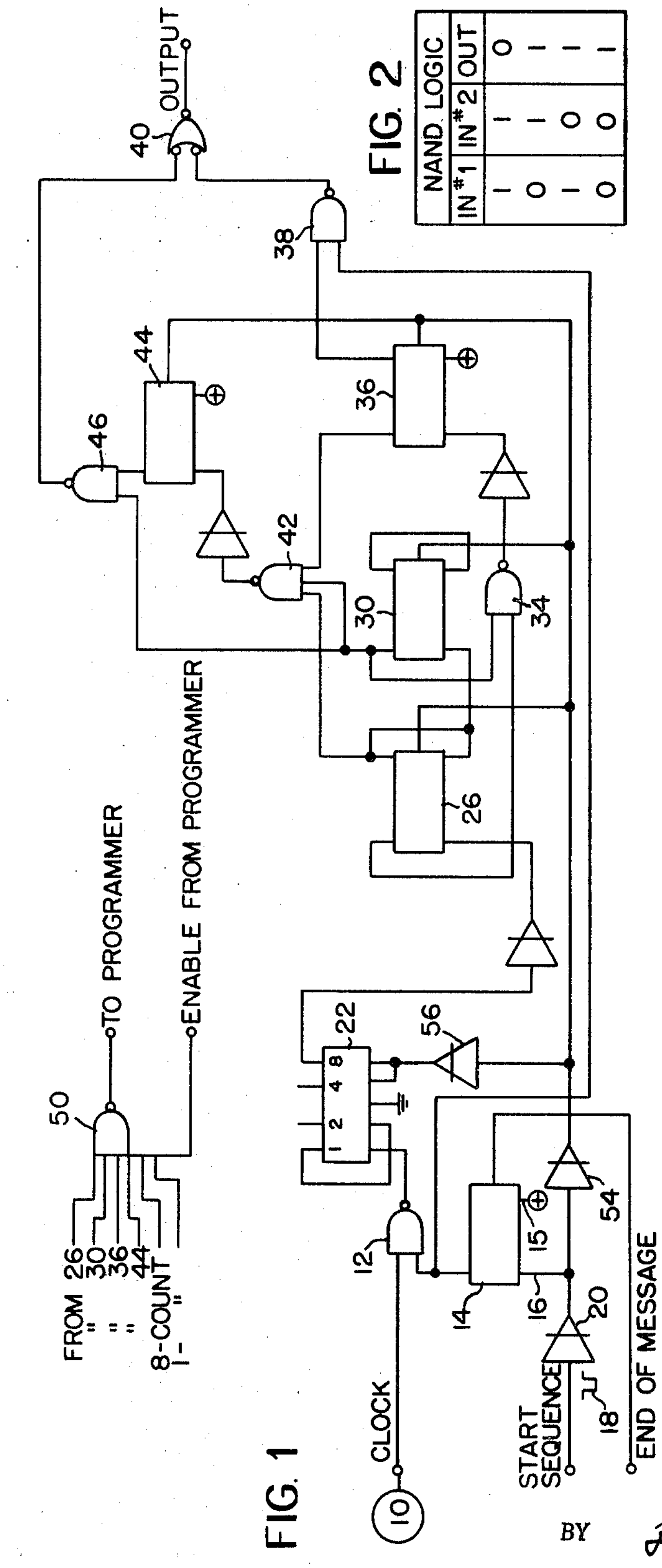
FIG. 1 is a schematic circuit diagram of a pulse generating circuit according to the invention.
FIG. 2 is a chart illustrating the binary logic of the NAND gates included in the circuit shown in FIG. 1.

Referring now to the drawing, the pulse generator shown operates responsively to the clock 10 of the transmitter, which may run at any of many different rates depending on collateral factors beyond the scope of the invention. It is enough for the present description to say that for any given message the clock frequency is essentially constant. The system is arranged so that each data pulse persists for twenty cycles of the clock 10, thereby automatically providing an accuracy of five percent based on the length of the data pulses. The clock operates continuously, and its output signal is applied to one input of an AND gate 12, which is inhibited during idle periods and held partially enabled during transmission periods.

Inhibition and partial enabling of the AND gate 12 is accomplished by connecting its second input to the the direct output of a CONTROL flip-flop 14, which is arranged to latch electrically once it is set until a signal is applied to its RESET, or CLEAR terminal, The flip-flop 14 is of the kind known commercially as type TTyL, as are all the other flip-flops in the circuit, and can be arranged for electrical latching simply by connecting its second input terminal 15 to a voltage source positive relative to ground.

The flip-flop 14 is triggered by the application to its first input terminal 16 of a START pulse 18 from the transmitter. The START pulse 18 is applied through an inverter 20 to obtain proper polarity of the pulse 18 to trigger the flip-flop 14. Other inverters (not separately designated) are included in the circuit at other points for the same purpose, as will readily be understood by those familiar with the electrical art, and will not be specifically mentioned herein. It will simply be taken for granted that where the characteristics of the particular flip-flops used require a pulse, or application of a potential of opposite polarity from the pulse or potential available from the desired source point, an inverter is included to reverse the polarity.

Moreover, to simplify the description, potentials will be denoted herein in binary terms, "zero" indicating ground, or reference potential, and "one" indicating a potential different from ground, always of the same value and polarity, the actual values of which are matters of designer's choice.

Figure 3:
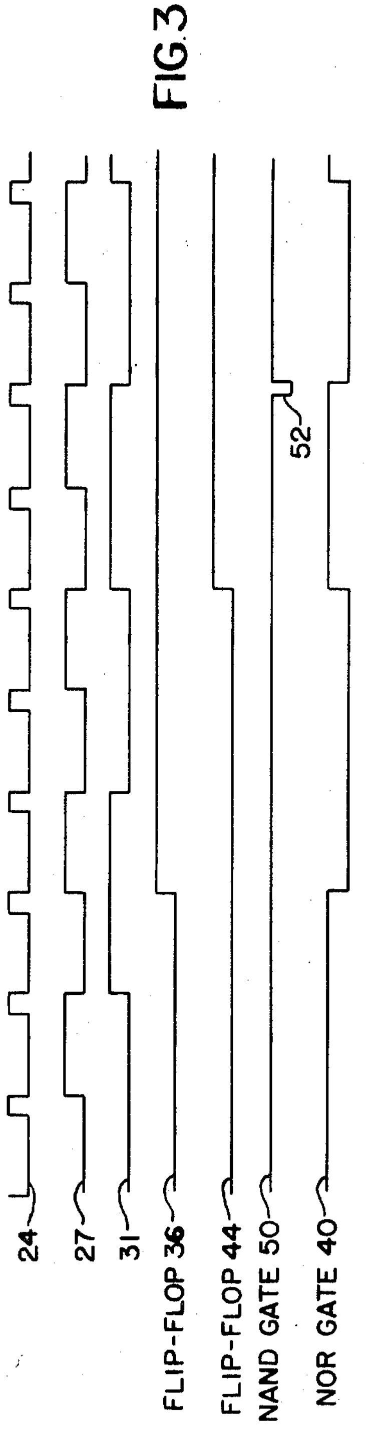
FIG. 3 is a chart illustrating the timing of the circuit, and showing voltage waveforms that occur at various different points in it.

Returning now to the clock 10, once the flip-flop 14 is triggered by the START pulse 20, the gate 12 is enabled, and the clock signal is fed to a counter 22, which is arranged to divide by ten, and to produce an output signal 24 (FIG. 3) consisting of pulses, one for each group of ten clock pulses, each starting at the beginning of the eighth clock pulse of the group and ending at the beginning of the last.

The output signal 24 from the counter 22 is fed to a first counting flip-flop 26, which divides the signal 24 by two, and produces a square wave output signal 27 (FIG. 3) consisting of a series of alternately "zero" and "one" pulses, each ten clock pulses in length. The inverted output of the flip-flop 26 is fed to a second counting flip-flop 30, which divides the signal 27 by two to produce a second square wave signal 31 defining intervals equal to twenty clock pulses each.

The inverted output signal from the first flip-flop 26 is fed to an AND gate 34 together with the direct output of the second flip-flop 30 to trigger a third flip-flop 36, which, like the control flip-flop 14, is connected for electrical latching so that, once set, it remains set until a signal is applied to its SET, or CLEAR terminal. The inverted output of the third flip-flop 36 is applied through a NAND gate 38 to one input of a NOR gate 40, the output of which constitutes the output signal of the overall circuit.

The inverted output of the first counting flip-flop 26 is applied, together with the direct outputs of the second and third flip-flops 30 and 36, respectively, to another NAND gate 42 to trigger a fourth flip-flop 44, which is also connected for electrical latching. The direct outputs of the second and fourth flip-flops 30 and 44, respectively, are applied to respective inputs of another NAND gate 46, the output of which constitutes the second input of the NOR gate 40.

OPERATION

For convenience in analyzing the operation of the circuit, the logic characteristics of the NAND gates are outlined in FIG. 2. The logic may be thought of as producing a binary "one" at the output of the gate whenever the inputs are "not and," and a binary "zero" whenever the inputs are "and."

In operation, the output signals 27 and 31 of the first and second flip-flops 26 and 30, respectively, are added by the AND gate 34 and the third flip-flop 36 to produce a change in signal level at the output of the NOR gate 40 from a "one" to a "zero" at the beginning of the thirtieth clock pulse following the START signal 18. The NAND gate 42, and the fourth flip-flop 44 add the outputs of the first three flip-flops 26, 30, and 36, respectively, to restore the output of the NOR gate 40 to "one" at the beginning of the sixtieth clock pulse. This completes the synchronizing signal. The third and fourth flip-flops 36 and 44, respectively, remain latched throughout the duration of the following message, and the output of the NOR gate 40 simply follows the signal 31 at the direct output of the second flip-flop 30, and consists of a square wave defining intervals equal to twenty clock pulses each, which are sent to the code generator of the transmitter to control the duration of the data pulses.

In addition, once the synchronizing signal is completed, it is desired to produce a START DATA signal for delivery to the code generator to time the beginning of its output. In the circuit as shown, this is done by applying the outputs of all four of the flip-flops 26, 30, 36 and 44, the "eight" and the "one" count outputs of the counter 22, and an enabling signal from the code generator to separate respective inputs of a START DATA NAND gate 50. The output of the NAND gate 50 then consists of a single pulse 52 (FIG. 3) coincident in time with the nineteenth clock pulse following completion of the synchronizing signal. The code generator responds to the trailing edge of the pulse 52 to transmit the first pulse of the data train in the next succeeding interval of twenty clock pulses duration.

At the end of the message, the code generator delivers an END OF MESSAGE pulse to the RESET, or CLEAR terminal of the control flip-flop 14 to inhibit the AND gate 12, thereby stopping the counter 22 and putting the circuit into a standby, or idle condition. The counting flip-flops 26, 30, 36, and 44 are reset, or cleared at the same time by the application of an END pulse at the same terminal where the START pulse 18 appears. The output of the NOR gate 40 reverts to its "zero" condition pending the start of the next transmission.

What is claimed is:

1. A pulse generator for producing a signal for synchronizing a receiver with a transmitter in a system of the kind including a clock, and in which data is transmitted by pulses each having a duration of *n* clock units, and the synchronizing signal consists of two successive pulses of mutually different values each having a duration equal to one and one-half *n* clock units, said generator comprising:

(a) a divide-by-ten counter for producing a series of output pulses spaced at ten clock unit intervals, (b) a first flip-flop responsive to said counter for producing a first square wave signal at one-half the repetition rate of the output pulses of said counter;

(c) a second flip-flop responsive to said first flip-flop for producing a second square wave signal at one-half the repetition rate of the first square wave signal;

(d) a third flip-flop for producing an output signal in response to the combination of the first and second square wave signals;

(e) a fourth flip-flop for producing another output signal in response to the combination of the first and second square wave signals and the output signal from said third flip-flop; and (f) gate means for combining said square waves and the output signals of said third and fourth flip-flops to produce a final output signal conforming to the desired synchronizing signal.

References Cited

UNITED STATES PATENTS

| | | | |
|---|---|---|---|
| 3,044,065 | 7/1962 | Barney et al. | 328—63X |
| 3,218,560 | 11/1965 | Peters | 307—269X |
| 3,309,463 | 3/1967 | Roedl | 178—69.5 |

STANLEY D. MILLER, Jr., Primary Examiner

U.S. Cl. X.R.

178—69.5; 307—208, 269; 328—72